March 29, 1960     U. S. RICHARDS     2,930,557
MOUNTS FOR CALENDARS AND MEMORANDUM PADS
Filed June 3, 1954     4 Sheets-Sheet 1

Inventor
Url S. Richards
by Roberts, Cushman & Grover
Att'ys.

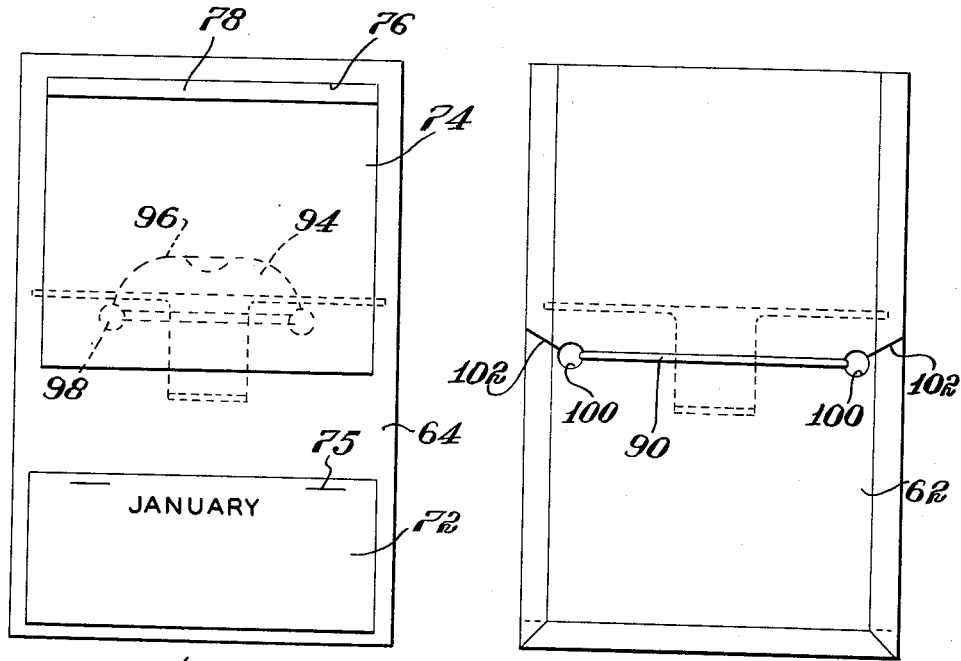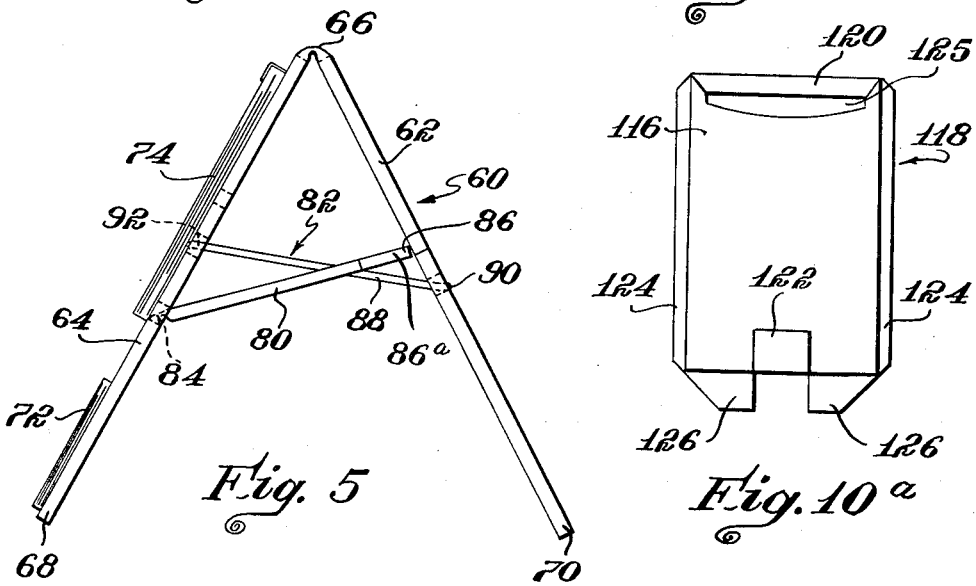

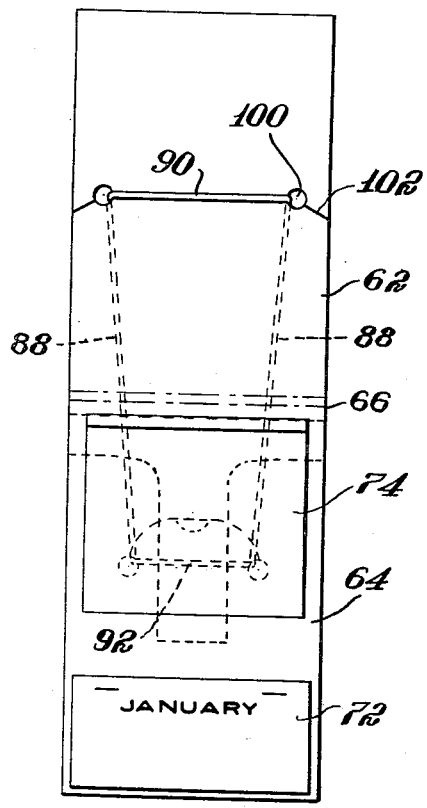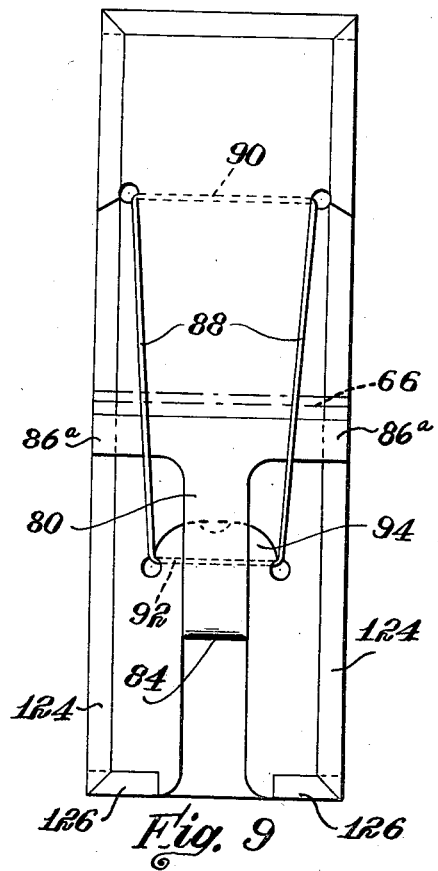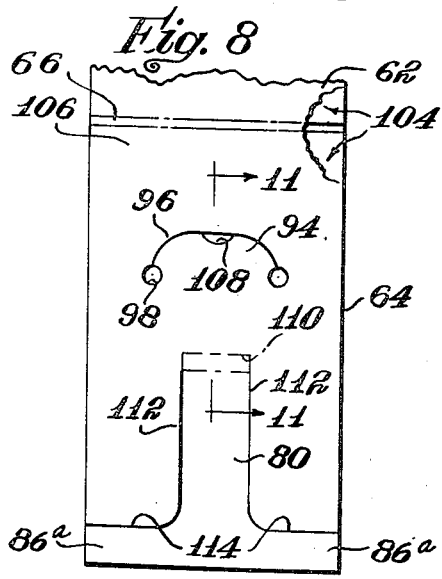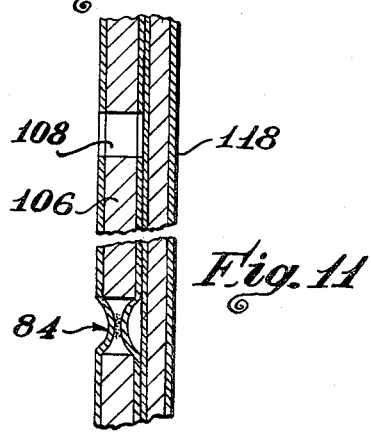

March 29, 1960  U. S. RICHARDS  2,930,557
MOUNTS FOR CALENDARS AND MEMORANDUM PADS
Filed June 3, 1954
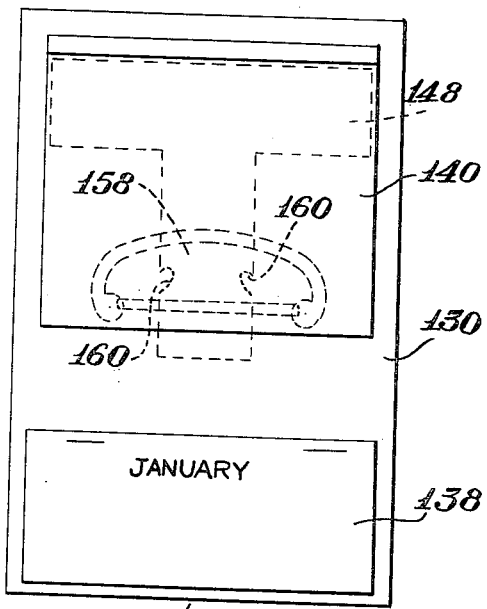
Fig.13
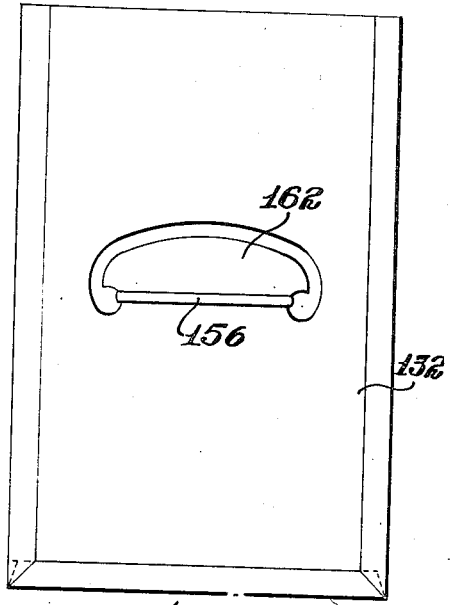
Fig.14
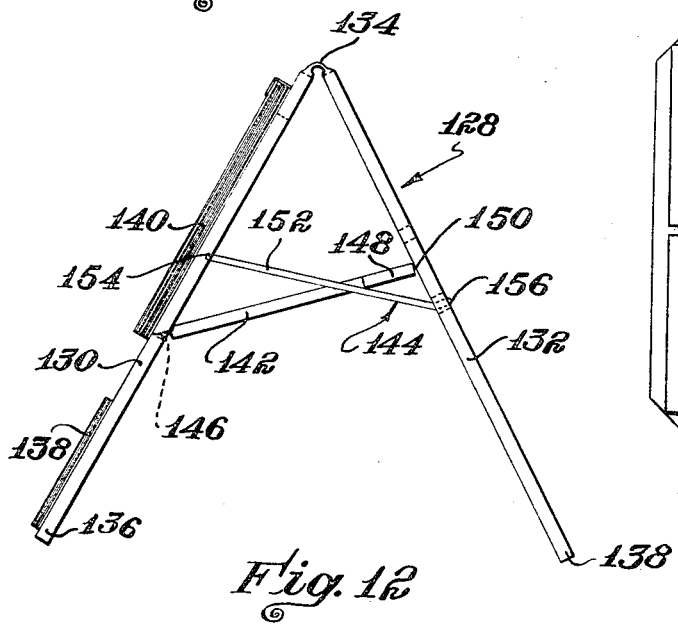
Fig.12
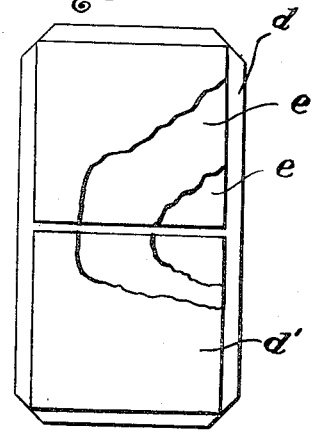
Fig.4ª
Inventor
Url S. Richards
by Roberts, Cushman & Grover
Att'ys.

United States Patent Office 2,930,557
Patented Mar. 29, 1960

2,930,557
MOUNTS FOR CALENDARS AND MEMORANDUM PADS

Url S. Richards, Otsego, Mich.

Application June 3, 1954, Serial No. 434,193

9 Claims. (Cl. 248—35)

This invention relates to mounts for desk calendars and memorandum pads and to methods of making the same.

The principal objects of the invention are to provide an easel type mount wherein there are supporting parts diverging from a hinge joining them to which may be permanently or removably attached a calendar pad and/or one or more writing pads, which will normally support the calendar in an upright rearwardly, inclined position so that it is conveniently visible but which may be disposed in a flattened position for convenience in writing on the memorandum pad or pads. Other objects are to provide a mount which will sturdily resist collapse by accidental placing of other objects against it, and which has a broad base or footing so that it will resist tipping over. A further object is to provide a very stable structure which may be easily converted from its upright position as an easel mount to a flattened condition for use as a pad, solely by an application of pressure to the hinge which connects the parts thereof, which pressure depresses the apex and is accompanied by lateral spreading of its legs until they reach a common plane without manipulation of any part or parts of it. Another object is to provide a mount of the foregoing kind which will automatically restore itself to easel supporting position when the pressure holding it flattened for use as a memorandum pad is released. Another object is to provide an easel of the aforesaid kind which can be held in pad functioning position without conscious effort on the part of the user and yet will pop up to its easel functioning position with a snap and without manipulation. Another object is to provide a calendar and pad mount of the foregoing kind which is highly decorative in appearance, easy to manufacture by production methods, in which the operative elements are concealed between the parts, which is durable and which may be easily dismantled so that the parts may be shipped or stored in a flat, or folded condition as desired.

As herein illustrated, the combined calendar and writing pad mount comprises a sheet member having parts movable relative to each other about a common hinge intermediate its ends so that they are free to be folded toward and away from each other from a position in which they occupy parallel planes in contact with each other to a position in which they occupy a common plane end to end. The parts are adapted to be disposed angularly with respect to each other with their free ends forming a footing for the device and the parts are held in this position by the cooperative action of a brace located between the parts which in one position limits the priximity of the parts and in another position permits collapse thereof and a yieldable element which holds the brace frictionally engaged with the parts when the latter are located in the first position but permits the parts to be unfolded and flattened. The brace is flexibly connected at only one end to one of the parts and is movable relative to that part from a position in contact with the surface thereof to a position extending angularly therefrom for contact of its free end with the other part. The elastic element is connected to the two parts so that it opposes flattening thereof by application of pressure to the hinge and will restore the parts to the unflattened position when pressure is removed and is so designed that it supports the brace in its operative position and is itself under tension when the brace is in operative position. The hinged end of the brace is situated below the corresponding anchored end of the elastic element and its free end is located above the elastic element near the opposite anchored end thereof and this latter end is adapted to rest on the elastic element.

The invention will now be described in greater detail with reference to the accompanying drawings wherein:

Fig. 4a is a plan view of the mount shown in Fig. 1, in one stage of its manufacture;

Fig. 5 is a side elevation of a modified form of combined calendar pad and memorandum pad mount shown erect;

Fig. 6 is a front view of Fig. 5;

Fig. 7 is a back view of Fig. 5;

Fig. 8 is a plan view of the outer side of the mount shown in Fig. 5, with the parts folded outwardly so as to be flat;

Fig. 9 is a plan view of the inner side of the mount shown in Fig. 5, with the parts folded outwardly so as to be flat;

Fig. 10 is a plan view of the parts of the mount shown in Fig. 5, in one stage of its manufacture;

Fig. 10a is a plan view of the outer ply of the calendar supporting part of the mount shown in Fig. 5, in one stage of its manufacture.

Fig. 11 is a section taken on the line 11—11 (Fig. 10);

Fig. 12 is a side elevation of still another form of the combined calendar mount and memorandum pad mount erect;

Fig. 13 is a front view of the mount shown in Fig. 12;

Fig. 14 is a rear view of the mount shown in Fig. 12.

Figure 2:
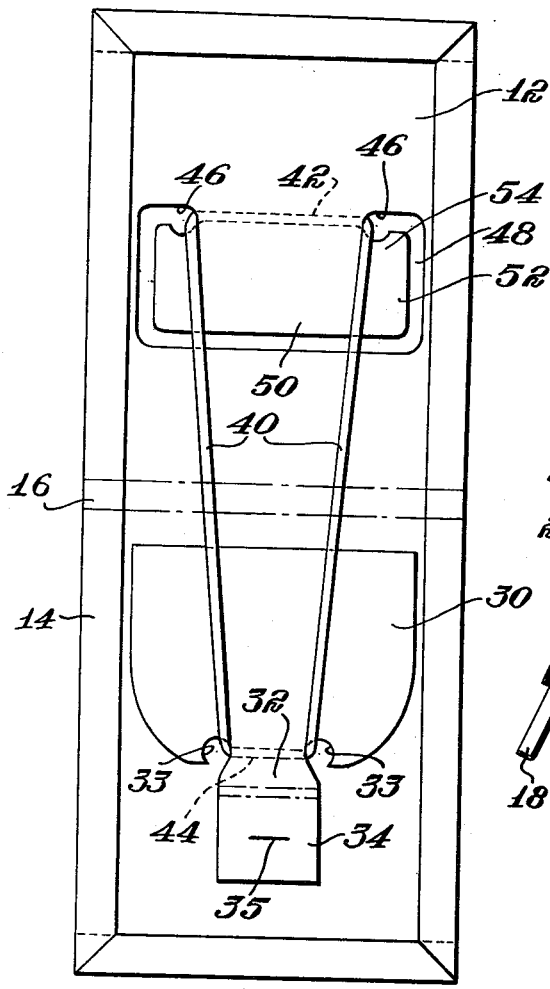
Fig. 2 is a plan view of the inner side of the mount with the parts folded outwardly so as to be flat.
Figure 3:
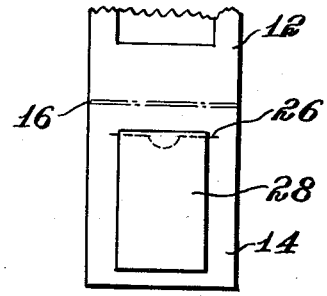
Fig. 3 is a plan view of the outer side of the mount with the parts folded outwardly so as to be flat with a portion of the part carrying the calendar pad omitted.
Figure 4:
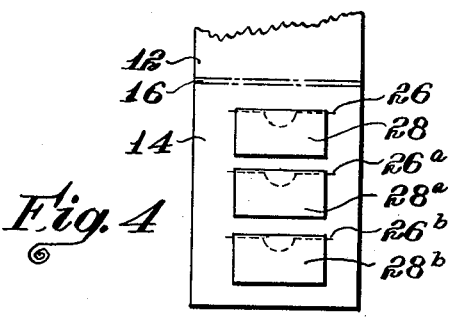
Fig. 4 is a view corresponding to Fig. 3, showing the part carrying the memorandum pads altered to accommodate two or more such pads.

Referring to Figs. 1 to 4a, inclusive, the combined calendar and memorandum pad mount, generally identified by the reference character 10, is shown as having parts 12 and 14 flexibly joined by a hinge 16 so that they may be disposed at an angular position with reference to each other with their free ends 18 and 20 serving as feet for supporting the mount in an erect position with the parts 12 and 14 inclined. One of the parts, for example, the part 12 has a pocket 22 formed by making a slit therein or therethrough to receive the back leaf or board of a calendar pad 24. Alternatively, a facing wrapping may be placed about the part with its upper edge unattached to the part so that the back leaf may be thrust between it and the part or the calendar pad may be cemented or stapled to the part 12. The other part 14 may have stapled to it a memorandum pad. Preferably, however, the part 14 has a pocket 26 as shown in Fig. 3, in which is removably inserted the back leaf or board of a memorandum pad 28 or as shown in Fig. 4, may have a series of pockets 26, 26a and 26b in which one or more memorandum pads 28, 28a and 28b may be inserted.

Figure 1A:
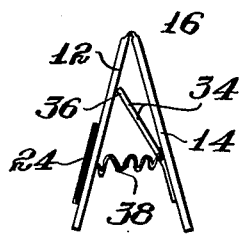
Fig. 1a is a side elevation of the mount partially collapsed.
Figure 1:
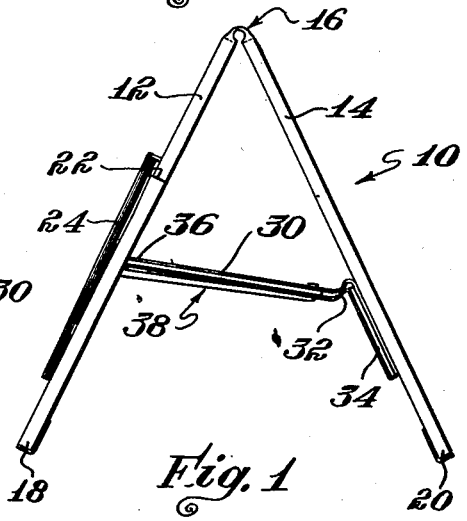
Fig. 1 is a side elevation of the combined calendar mount and memorandum pad mount erect, that is in the position it would normally occupy as a calendar support.

The parts 12 and 14 are held in operative position, that is erect as shown in Fig. 1, during normal use of the device as a calendar mount in accordance with this invention by a brace and elastic means which cooperate to hold the parts frictionally engaged with the brace at a predetermined spacing so that it sturdily resists collapse or accidental tipping but nevertheless permits unfolding the parts to a flattened position in contact with the top of the desk or table so that the memorandum pad carried by the part 14 may be used in the normal position for writing and alternatively will permit the parts 12 and 14 to be collapsed into parallel planes with the brace folded therebetween for storage or shipment.

The brace 30 is located between the parts 12 and 14 and consists of a broad, stiff board flexibly connected at one end by a hinge 32 to an anchoring tab 34, which is fastened for example, by a staple 35 to the part 14. The opposite end 36 is unconnected and as thus constructed the brace 30 is free to be moved from a position in contact with the inner surface of the part 14 to a position extending angularly therefrom with its end 36 abutting the inner face of the opposite part 12. At the base or connected end of the brace 30 there are spaced recesses 33 having entrances from the edge of the brace and edges which form spaced shoulders. The elastic member 38 may be a continuous elastic band and is disposed between the parts 12 and 14 so that two strands of it 40—40 extend in transversely spaced relation from one part to the other and are anchored to the parts at opposite ends by connecting strands 42 and 44. The ends of the strands 40—40 joined by the strand 44 are anchored in place as illustrated in Fig. 2, by looping the strand 44 beneath or behind the flexible hinge 32 so that the strands 40—40 extend through the recesses 33—33, across the shoulders and across the lower or outer face of the brace 30 toward the opposite part 12. The opposite ends of the strand 40—40 connected by the strand 42 are anchored by looping the strand 42 in a similar fashion about a tab 50 integral with the part 12. The tab preferably is formed by making a pair of recesses or apertures 46—46 in the part 12 and then connecting them by symmetrically formed, outward, downwardly and inwardly extending cuts 48—48 which join midway of the edges. As thus made the tab 50 has laterally spaced ears 52—52 forming spaced shoulders 54—54. The strand 42 is looped behind the tab 50 and the strands 40—40 extend through the apertures 46—46 over the shoulders 54—54.

The elastic element 38 is made of such linear dimensions that when looped over the shoulders of the tab 50 and the shoulders at the base of the brace 30, the strands 40—40 will be under a substantial amount of tension when the brace 30 occupies the position shown in Fig. 1, with its end 36 abutting the part 12. The member 38, however, is elastic enough so that the parts 12 and 14 may be unfolded so as to lie perfectly flat, any pressure exerted on the hinge forcing the parts downwardly and outwardly or by grasping the foot extremities of the parts 12 and 14 and spreading them apart until the parts 12 and 14 lie in a common plane without breaking and with sufficient restorative power to draw the parts together automatically and with a snap when pressure is released at the hinge so that the parts automatically reestablish their angular position with the brace located in the position shown in Fig. 1.

At its operative position the brace 30 is supported on its underside by the strands 40—40 which serve to limit its lowermost position so that it cannot accidentally fall below its bracing position and at the same time holds the end 36 frictionally engaged with the part 12 so that it is not easily displaced except by spreading the legs sufficiently to disengage this end and then folding it upwardly as illustrated in Fig. 1a, in which it is partially collapsed.

As thus constructed with the parts disposed as shown in Fig. 1, the mount provides a conventional support for a calendar pad for use on a desk or table and at the same time a storage place for memorandum pads and has the advantage that the memorandum pad may be turned toward the person seated at the desk so as to be concealed from any one standing at the front of the desk and at the same time to present a nice appearing calendar to one at the front of the desk. For use in making memorandums, the parts 12 and 14 can be easily flattened merely by pressing downwardly on the hinge without other manipulation of the parts and without conscious effort on the part of the user and retained in this position with the part 14 next to the writer whereupon he can make such notes as he desires on one or more of the pads. Having finished he merely releases or removes his hand from the mount and it immediately pops up to its normal erect position. If it becomes desirable to store the device in the desk drawer, it may easily be collapsed so that the parts 12 and 14 are in contact with each other with the brace folded therebetween and the elastic member relaxed by first separating the parts 12 and 14 sufficiently to release frictional engagement between the free end of the leg and the part 12, then folding the brace upwardly into the crotch between the parts (Fig. 1a) and finally folding the parts together so that it forms a compact, flat package. Since the elastic member is relaxed there is no tendency for them to spring apart and hence they will lie flat and compact without danger of spreading and catching in the draw. This feature is also important from the standpoint of shipping to the manufacturer. Alternatively, for shipment the parts may be opened out into a flat position by the simple expedient of disengaging one of the strands 42 or 44 from the tab 50 or the brace 30.

As herein illustrated the parts 12 and 14 are comprised of separate pieces of stiff paperboard arranged end to end with a space therebetween and covered on both sides with a thin flexible decorative facing material, for example, paper which extends continuously from one piece to the other across the space so that the joint 16 is formed solely by the adhering portions of the facing material. The pockets 22 and 26 may be formed by slitting the facing material so that the back sheet of the calendar or pad can be slipped through the sheet behind the facing material. Alternatively, each of the parts 12 and 14 are comprised of two sheets of stiff paperboard of commensurate area placed face to face with a space between adjacent ends and covered on both sides with thin decorative facing paper so as to span the space and to form a flexible joint between them. With this construction a slot may be made in the outer board of the part 12 so that the rear or back leaf of the calendar may be thrust between the boards or the front board may be cut out to form a recess for receiving the entire calendar pad and the latter may be placed therein and stapled to the rear one of the two boards. In like manner, the front board of the part 14 may be slit in one or more places to receive the back sheet of one or more memorandum pads between it and the rear one of the two boards. With this two-ply construction the tab 50 in the part 12 is formed by cutting through the rear one of the plies so that the strand 42 may be looped behind it and frictionally retained between it and the front ply and will be wholly concealed from the front of the part 12. While the brace 30 is illustrated as being fastened to the part 14 by an anchoring tab and staple, it is within the scope of the invention to form the brace by cutting it out of the rear ply of the part 14 so that it is free to hinge about its lower end in the same manner as heretofore described.

The mount is constructed in its preferred form as heretofore indicated of two plies of stiff paperboard which are placed face to face and joined by a covering of decorative facing material. More specifically (Fig. 4a) a sheet of thin decorative facing material d is first laid down on a work surface then four pieces of stiff paperboard e of commensurate area are laid on the facing material in superposed pairs with a space between the adjacent ends of the pairs, then a second piece of facing material d', no wider than the boards and no longer than their combined length including the space therebetween is placed on top of them and finally the margin of the first piece d is folded over the edges of the boards and adhesively secured to the margins of the second piece of facing material. As thus prepared a blank having two parts, each of which is comprised of double ply board is provided wherein the parts are hinged together by the flexible facing material extending between the adjacent ends of the boards so that they are free to be folded from a position in which the parts lie in parallel planes in contact with each other to an unfolded flat position in which the parts lie end to end. If the calendar pad is to be attached by slipping the back leaf through a slot in one part, the blank is placed flat on the working surface and a cutter is brought down upon it so as to cut through the outer most ply of the part which is to form the front of the easel, being limited in its depth of cut by appropriate means to prevent cutting into or through the second ply. Alternatively, if a recess is to be made in the part to receive the entire calendar pad the cutter is shaped to cut through the ply along four sides to form a substantially rectangular window, by separating a rectangular portion of the front ply therefrom. The blank is now turned over on its opposite side and a cutter suitably shaped to make the apertures 46 and the slots 48—48, is brought to bear upon the back side of the other part so as to cut through the substance of the part to provide the tab 50 and shoulders 54—54 for receiving behind it the elastic member.

If in accordance with the provisions of this invention the mount is to be used not only for supporting a calendar but for supporting memorandum pads, additional cuts 26, 26a and 26b are made in the outer ply of the other part at the same time that the cuts are made for receiving the calendar pad. Such cuts are made by appropriate cutting members limited to cut through the outer ply only and may be arranged to make one or more cuts in parallel spaced relation and if desired each cut may have in it a shallow recess to facilitate reception of the finger for pulling the ply forwardly sufficiently to permit slipping the rear leaf of the memorandum pad through the slot.

The brace 30 and tab 34 are cut out of paperboard as separate pieces and connected in spaced relation by facing paper to provide the flexible hinge 32. The brace 30, however, may be an integral part of the inner ply of one of the parts and if so may be cut therefrom by a suitably shaped cutting die which will leave a portion of it corresponding to the tab connected, which part may be scored or weakened to provide a suitable hinge.

The mount just described is preferred for the reason that it is durable, attractive, easy to manufacture and easy to assemble. It is contemplated that various modifications embodying the same principle of operations may be devised and one such modification is shown in Figs. 5 to 11 inclusive. As there shown (Fig. 5) the mount 60 has parts 62 and 64 flexibly connected at their upper or adjacent ends by a hinge 66. The unconnected ends 68 and 70 form feet for supporting the mount in an upright or erect position with the parts 62 and 64 diverging. In this form the part 64 carries both the calendar pad 72 and the memorandum pad 74. The calendar pad is indicated as attached by staples 75 although it is to be understood that if the part 64 is of two ply construction as previously described with respect to the preferred form it may have a slot or recess through the front ply to receive the back leaf of the pad or to receive the entire pad so that its front leaf is flush with the front face thereof. A second recess or slot 76 is cut through the front ply of the part 64 so as to remove a narrow width of the board at this point and the rear leaf of the memorandum pad is inserted through the slot downwardly between the plies so as to bring the bound edge 78 of the memorandum pad 74 into the recess with its upper edge engaged beneath the upper edge of the slot 76 thereby to firmly hold it in place.

The parts 62 and 64 are held in diverging position by the cooperative action of a brace member 80 and an elastic element 82. The brace 80 is hinged at 84 to the part 64, being cut from the substance of the rear ply of the part 64, as will appear hereinafter and is free to swing from the rear plane of the part 64 outwardly and downwardly so that its free extremity 86 may be brought into abutting engagement with the part 62. The elastic element 82 is anchored between the parts 62 and 64 with its ends at a level above the hinge 84 of the brace 80 and consists of transversely spaced strands 88—88 connected at their ends by strands 90 and 92. Anchorage is afforded in the part 64 by a tongue 94 (Fig. 6) separated from the rear ply of the part 64 by a transversely extending curved cut 96 which intersects at its ends a pair of spaced holes 98—98 and which affords spaced shoulders behind which the strand 92 may be placed. The opposite end of the elastic member is anchored in a pair of transversely spaced openings or apertures 100—100 made through the member 62 at a level above the brace hinge 84. Entrance to the respective apertures is afforded by slits 102—102 extending from the apertures through the substance of the part 62 to the lateral edges thereof. The connecting strand 90 is drawn through the slits 102—102 into the apertures and looped across the back side of the member 62 between the apertures.

As thus constructed the parts 62 and 64 are disposed in angular position with respect to each other with the brace 80 rising from its hinge 84 upwardly between the strands 88—88. Near the end of the brace there are opposed lateral extensions 86a—86a which rest on the strands 88—88. The end edge of the brace frictionally engages the part 62 and when disposed in their position the elastic member is under tension so that the end of the brace is frictionally engaged with the part 62 and resists displacement. The elastic member is, however, elastic enough to permit the parts 62 and 64 to be forced down into the plane of the desk top by pressure applied to the hinge 62 and to be held in this position without conscious effort on his part while the user is making a memorandum on the memorandum pad 74. Release of the pressure will result in a pop up action on the part of the mount, that is the elastic will restore the parts 62 and 64 to their original position with the brace fractionally engaged with the part 62 vigorously and promptly. If it is desirable to store the mount away the parts are spread sufficiently to permit folding the brace 80 upwardly toward the apex whereupon the parts are brought together and in this position the elastic will be completely relaxed. Alternatively, the elastic may be disengaged from the tab 94 so that the parts may be unfolded.

The aforesaid mount is made of stiff paperboard cut and covered with decorative facing material as follows: Two substantially rectangular pieces of board 104—104 (Fig. 10) are placed end to end with a space therebetween and then covered on both surfaces with ornamental facing paper 106. The paper crossing the gap between the two boards forms the hinge 66 between them. The tab 94 is then formed by making the through cut 96 and the apertures 98—98. If desired to assist in separating the tab to facilitate placing the elastic member behind it a notch 108 may be cut out of the substance of the tab near the center top edge thereof. Prior to covering the board in which the tab is cut, a transversely extending, substantially rectangular slot 110 is made which is covered when the facing paper is applied thereto. The brace 80 is formed by making spaced parallel cuts 112—112 symmetrically with respect to the longitudinal center line of the board which extend from the opposite ends of the covered slot 110 to near the end of the board where they are curved laterally in opposite directions as at 114—114 and extend through the lateral edges of the board thereby forming a T-shaped end on the brace which provides the opposed lateral extensions 88a—88a. Similarly, the other board may be cut to provide the openings 100—100 and the slots 102—102. A substantially rectangular piece of paperboard 116 (Fig. 10a) is then prepared by adhesively applying to one side thereof a piece of decorative facing paper 118 of larger overall area than the board so that its margin extends beyond the edges of the board and then folding the upper margin 120 and a small portion of the lower margin 122 and securing them to the opposite side. A substantially rectangular opening 76 is then cut through the facing paper and the board. The brace 80 as shown in Fig. 10, is folded on its hinge 84 whereupon the piece 116 is applied to the back side of the board 104 with its edges aligned therewith. The unfolded margins 124—124 and 126—126 are then folded over the edges of the board 104 and secured in place as shown in Fig. 9, thus binding the parts 104 and 116 in contact with each other. These parts as thus secured in combination form the part 64. The part 62 is of single ply thickness. The calendar pad 72 is then stapled in place and the memorandum pad 74 is slipped into the slot 76.

Another modification is shown in Figs. 12 to 14 inclusive, wherein the mount 128 has parts 130 and 132 flexibly connected at their upper or adjacent ends by a hinge 134. The unconnected ends 136 and 138 form feet for supporting the mount in an upright or erect position with the parts 130 and 132 diverging. The part 130 is shown as carrying both the calendar pad 138 and the memorandum pad 140, however, it is to be understood that the memorandum pad may alternatively be attached to or placed on the part 132. The calendar pad and memorandum pad may be attached to the parts 130 and 132 in any one of the various ways prescribed with reference to the foregoing mounts.

The parts 130 and 132 are held in diverging position by the cooperative action of a brace 142 and an elastic element 144. The brace 142 as shown in Fig. 13, is connected by a hinge 146 to the part 130. The opposite end of the brace has opposed lateral extensions 148—148 and an end edge 150, the latter bearing against the part 132. The elastic element 144 has transversely, spaced strands 152 extending between the parts 130 and 132 which are anchored to the parts at their opposite ends by connecting strands 154 and 156. The strand 154 is anchored to the part 130 either behind a tab 158 formed at the inner side of the part 130 or in a pair of spaced recesses 160—160 cut in the edge of the brace itself. The opposite strand 156 is anchored about a tab 162 formed in the part 132. As thus constructed the brace rises upwardly from the part 130 between the strands 152—152 so that the lateral extensions 148—148 rest on the strands 152—152 and its end edge 150 bears against the part 132.

In this form of the invention the parts 130 and 132 are made of double ply material joined together with facing paper and the tabs and brace are cut in the inner ones of the plies of the respective parts, in the same manner as described heretofore with reference to the preceding mounts.

The three forms of the invention illustrated and described above are not intended in any way to be limiting as to the pop up principle involved. Accordingly, while the parts are shown of uniform width and of substantially rectangular configuration they may have other shapes, for example, one part may be narrower and the parts may be made of single or multiple construction covered or not with facing paper. Moreover, while the hinge connecting the parts and the brace have been shown as formed of thin layers of decorative facing material spanning a gap between the parts this is but one form of hinge that may be employed for it is contemplated that any conventional hinge structure may be employed, for example, scoring, embossing or if desired some metallic hinge element. The manner shown for anchoring the elastic element is not to be considered limiting as any suitable means may be employed preference being given to a method which permits ease in attaching and detaching the elastic element. Furthermore, while the elastic element is usually rubber it is within the scope of invention to use any equivalent elastic element.

It should be understood that the present disclosure is for the purpose of illustration only and this invention includes all modifications and equivalents which fall within the scope of the appended claims.

I claim:

1. An easel type mount comprising a pair of legs, one of which is adapted to support one or more articles, hinge means connecting said legs together for disposition at a predetermined angle with respect to each other, said legs having lower ends constituting feet, elastically yieldable means operating on the legs in directions to move them toward each other, and a brace hinged to one of the legs operating in opposition to said elastically yieldable means to hold the legs spread apart at said predetermined angle, said elastically yieldable means being extensible to permit spreading the legs until they are flattened and operable to cause the legs to rebound to their original angular position when released.

2. An easel type mount comprising a pair of legs, one of which is adapted to carry articles and the other of which is adapted to support the one leg in an upright, rearwardly inclined position, said legs having upper and lower ends, hinge means connecting the upper ends, the lower ends constituting feet, and a brace holding the legs angularly disposed so that the feet provide a support for the mount, characterized in that the brace is hingedly connected to one leg and has a free end bearing against the other leg and that a stressed elastic strand is attached at its ends to the respective legs, said stressed strand yieldably holding the free end of the brace and said other leg engaged, and being extensible by the pressure applied to the top of the mount in a direction toward the surface on which the legs rest to spread the legs flat and operable when the pressure is released to restore the legs to their initial angular position with the free end of the brace operably engaged with said other leg.

3. An easel type mount comprising a pair of rigid legs, one of which is adapted to support one or more articles and the other of which is adapted to hold the one leg in an upright, rearwardly inclined position, said legs having upper and lower ends, a hinge connecting the upper end, said lower ends constituting feet and a brace holding the legs spread apart at said predetermined angular position so that the feet support the mount in an upright position, characterized in that the brace is hingedly connected to one leg and has a free end bearing against the other leg and that a stressed elastic strand is attached at its ends to the respective legs and that said stressed strand yieldably holds the free end of the brace and said other leg engaged, and is elastically extensible to a length at least equal to the linear distance between the places where the ends of the strand are attached to the legs when the latter are spread out flat.

4. A support comprising a member having parts disposed at a predetermined angle, a hinge connecting said parts for movement relative to each other about said hinge from said predetermined angular position to a spread-apart flat position, the free ends of said members constituting a footing for the support when the parts are disposed at said angle to each other for holding the support upright, an elastic element connecting the parts and operating on the parts to draw them together, and a brace located between the parts with one end hinged to one of the parts and the other end in unconnected abutting engagement with the other part, said brace operating in opposition to the elastic element to hold the parts at said predetermined angular position, a portion of said elastic element underlying the brace and operating to support the unconnected end of the brace at a level to maintain said predetermined angular spacing of the parts.

5. An easel type mount having parts disposed at a predetermined angle, one of which is adapted to carry one or more articles, a hinge connecting the parts together for relative movement with respect to each other from said predetermined angular position to a spread-apart flat position, the free ends of said parts constituting a footing for the mount when the parts occupy said predetermined angularly disposed position, elastically yieldable means operating on the parts in directions to draw the parts together and a brace hingedly connected to one of the parts operating in opposition to said elastic yieldable means to hold them spread apart at said predetermined angular position, characterized in that the parts of the mount may be spread flat but will rebound to their original angular position when released, that a part of the elastic means automatically restores the brace to its initial position during rebound so that the legs take up their original predetermined angular position.

6. A support comprising a member having front and back parts, one part adapted to support one or more articles, a hinge connecting the parts for disposition at a predetermined angle with respect to each other and for movement relative to each other about said hinge from said predetermined angular position to a spread-apart flat position, the free ends of said parts constituting a footing for the support when the parts are disposed at said angle to each other for holding the support upright, an elastic element connecting the parts, said elastic element operating on the parts to decrease the angle between them, a brace located between the parts, and a hinge anchoring one end of the brace to one of the parts, the other end of the brace being in unconnected abutting engagement with the other part, said brace operating in opposition to the elastic element to hold the parts at a predetermined angular spacing, and said elastic element supporting the free end of the brace at its place of abutment with said other part and at said position of the brace being under tension.

7. A support according to claim 6, wherein one part carries a calendar pad and the other a memorandum pad.

8. A support according to claim 6, wherein one part is provided with one or more vertically spaced pockets for receiving one or more pads.

9. A support according to claim 6, wherein each part is made of two plies, and the brace is an integral part of the inner ply of one part.

References Cited in the file of this patent

UNITED STATES PATENTS

| | | |
|---|---|---|
| 117,133 | Wright | July 18, 1871 |
| 890,135 | Gilliland | June 9, 1908 |
| 990,154 | Mitchell | Apr. 18, 1911 |
| 1,188,452 | Johnson | June 27, 1916 |
| 2,153,460 | Giles | Apr. 4, 1939 |
| 2,471,536 | Nichols | May 31, 1949 |
| 2,504,277 | Otterson | Apr. 18, 1950 |
| 2,676,777 | Moushon | Apr. 27, 1954 |
| 2,678,182 | Young | May 11, 1954 |

FOREIGN PATENTS

| | | |
|---|---|---|
| 28,975 | Austria | June 25, 1907 |
| 522,071 | Great Britain | June 7, 1940 |
| 1,093,193 | France | Nov. 17, 1954 |